US012584796B2

(12) United States Patent
Mazur

(10) Patent No.: US 12,584,796 B2
(45) Date of Patent: Mar. 24, 2026

(54) PASSIVE INFRARED SENSOR AND METHOD OF CONTROL

(71) Applicant: Kidde Fire Protection, LLC, Bradenton, FL (US)

(72) Inventor: Mateusz Mazur, Sopot (PL)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 353 days.

(21) Appl. No.: 18/313,925

(22) Filed: May 8, 2023

(65) Prior Publication Data

US 2023/0392989 A1      Dec. 7, 2023

(30) Foreign Application Priority Data

May 9, 2022      (EP) ..................................... 22172389

(51) Int. Cl.
| | |
|---|---|
| *G01J 5/10* | (2006.01) |
| *G01J 5/0806* | (2022.01) |
| *G02F 1/13* | (2006.01) |
| *G02F 1/163* | (2006.01) |

(52) U.S. Cl.
CPC .............. *G01J 5/10* (2013.01); *G01J 5/0806* (2013.01); *G02F 1/1323* (2013.01); *G02F 1/163* (2013.01); *G02F 2201/34* (2013.01); *G02F 2203/11* (2013.01)

(58) Field of Classification Search
CPC .......... G01J 5/10; G01J 5/0806; G02F 1/1323
See application file for complete search history.

(56) References Cited

U.S. PATENT DOCUMENTS

| | | | | | |
|---|---|---|---|---|---|
| 6,055,089 | A | * | 4/2000 | Schulz | .................... G02F 1/163 |
| | | | | | 359/275 |
| 8,867,118 | B2 | * | 10/2014 | Pei | .......................... G02F 1/153 |
| | | | | | 359/266 |
| 10,180,615 | B2 | | 1/2019 | Kilgore et al. | |
| 2014/0175281 | A1 | | 6/2014 | Reynolds et al. | |
| 2017/0140221 | A1 | * | 5/2017 | Ollila | ..................... G06V 40/19 |
| 2019/0250029 | A1 | * | 8/2019 | Zedlitz | .................. E06B 3/6715 |
| 2019/0323897 | A1 | | 10/2019 | Wang et al. | |

(Continued)

FOREIGN PATENT DOCUMENTS

| | | |
|---|---|---|
| EP | 0758929 B1 | 1/2002 |
| WO | 2022008340 A1 | 1/2022 |

OTHER PUBLICATIONS

"Electrochromic Window Material Blocks Infrared Radiation", The Engineer, Nov. 10, 2021, 07 Pages.

(Continued)

*Primary Examiner* — Hugh Maupin
(74) *Attorney, Agent, or Firm* — CANTOR COLBURN LLP

(57) ABSTRACT

A method of controlling a field of view of a passive infrared sensor, the method comprising: providing a passive infrared sensor comprising: an infrared detector configured to detect infrared signals from a plurality of detection zones; and an electrochromic mask comprising a plurality of electrochromic sections; and applying a voltage to one or more of the plurality of electrochromic sections to control transmission of a predetermined range of infrared signals to the detector from one or more of the plurality of detection zones.

13 Claims, 3 Drawing Sheets

(56) References Cited

U.S. PATENT DOCUMENTS

2021/0354627 A1\* 11/2021 Lynam .................. B60Q 1/2665
2024/0013162 A1\* 1/2024 Rasmus-Vorrath ..........................
G02F 1/1309

OTHER PUBLICATIONS

Franke et al., "All-Solid-State Electrochromic Reflectance Device for Emittance Modulation in the Far-Infrared Spectral Region", Applied Physics Letters, vol. 77, No. 7, Aug. 14, 2000, pp. 930-932.
Anna-Lena Larsson, "All-Thin-Film Electrochromic Devices for Optical and Thermal Modulation", Accessed on http://www.diva-portal.org/smash/get/diva2:163903/FULLTEXT01.pdf, 2004, 62 Pages.
Extended European Search Report received for EP Application No. 22172389.3, mailed on Oct. 21, 2022, 8 Pages.
Richardson, Thomas J., "New Electrochromic Mirror Systems", Solid State Ionics, vol. 165, Issues 1-4, Dec. 2003, pp. 305-308.
Xiang et al., "Reflective Property of Inorganic Electrochromic Materials", Journal of Inorganic Materials, vol. 36 , Issue 5, 2021, pp. 451-460 (Abstract Submitted).

\* cited by examiner

PASSIVE INFRARED SENSOR AND METHOD OF CONTROL

CROSS REFERENCE TO A RELATED APPLICATION

The application claims the benefit of European Patent Application No. 22172389.3 filed May 9, 2022, the contents of which are hereby incorporated in their entirety.

BACKGROUND

The present application relates to passive infrared sensors and methods of controlling such sensors.

A passive infrared sensor (PIR sensor) is an electronic sensor that measures infrared (IR) light radiating from objects in its field of view. They are most often used in PIR-based motion detectors. PIR sensors are commonly used in security alarms and automatic lighting applications.

PIR sensors are commonly called simply "PIR", or sometimes "PID", for "passive infrared detector". The term passive refers to the fact that PIR devices do not radiate energy for detection purposes. They work entirely by detecting infrared radiation (radiant heat) emitted by or reflected from objects. All objects with a temperature above absolute zero emit heat energy in the form of electromagnetic radiation. Usually this radiation isn't visible to the human eye because it radiates at infrared wavelengths, but it can be detected by electronic devices designed for such a purpose.

A PIR sensor can detect changes in the amount of infrared radiation impinging upon it, which varies depending on the temperature and surface characteristics of the objects in front of the sensor. When an object, such as a person, passes in front of the background, such as a wall, the temperature at that point in the sensor's field of view will rise from room temperature to body temperature, and then back again.

Pairs of sensor elements may be wired as opposite inputs to a differential amplifier. In such a configuration, the PIR measurements cancel each other so that the average temperature of the field of view is removed from the electrical signal; an increase of IR energy across the entire sensor is self-cancelling and will not trigger the device. This allows the device to resist false indications of change in the event of being exposed to brief flashes of light or field-wide illumination. At the same time, this differential arrangement minimizes common-mode interference, allowing the device to resist triggering due to nearby electric fields. When a PIR sensor is configured in a differential mode, it becomes applicable as a motion detector device. In this mode, when a movement is detected within the "line of sight" of the sensor, a pair of complementary pulses are processed at the output pin of the sensor, indicating movement.

PIRs come in many configurations for a wide variety of applications. The most common models have Fresnel lenses or mirror segments for directing passive infrared signals, an effective range of about 10 meters, and a field of view less than 180°. Models with wider fields of view, including 360°, are available, typically designed to mount on a ceiling. Some larger PIRs are made with single segment mirrors and can sense changes in infrared energy over 30 meters (100 feet) from the PIR.

In known systems, the field of view of a PIR sensor is restricted by masking/blinding some mirror and/or lens elements, for example by sticking black tape over such elements. Such manual operation can result in human error, which required more time for corrections, installation and verification. In known PIR sensors there is no ability for flexible control of the sensor's field of view.

BRIEF DESCRIPTION

According to a first aspect, the present invention provides a method of controlling a field of view of a passive infrared sensor, the method comprising: providing a passive infrared sensor comprising: an infrared detector configured to detect infrared signals from a plurality of detection zones; and an electrochromic mask comprising a plurality of electrochromic sections; and applying a voltage to one or more of the plurality of electrochromic sections to control transmission of a predetermined range of infrared signals to the detector from one or more of the plurality of detection zones.

The use of the electrochromic sections allows for flexible control of the field of view of the sensor, without requiring physical intervention. The application of voltage to the electrochromic sections is all that is required to control the transmission of infrared signals. This allows for faster installation of the sensor and reduces the possibility of human error in the installation process. Furthermore, any errors in the field of view can be quickly corrected with the application of voltage.

The field of view of the sensor may include one or both of a vertical field of view and a horizontal field of view.

By detection zones it is meant areas of space (e.g. in a room that the sensor is monitoring) from which signals can be generated (e.g. by a moving body) and detected by the sensor.

Each electrochromic section may be arranged to control transmission from a particular detection zone. For example, the detection zones and electrochromic sections may exist in a 1:1 ratio. The electrochromic sections may be arranged in a line or in a grid extending in both the horizontal and vertical direction.

The method may comprise: setting a desired field of view of the infrared sensor, wherein the desired field of view comprises a viewing angle; and determining which of the plurality of electrochromic sections a voltage needs to be applied to provide the desired field of view of the infrared sensor. The viewing angle may comprise a horizontal and/or vertical viewing angle.

The method may comprise: setting a desired range of the infrared sensor,
  determining which of the plurality of electrochromic sections a voltage needs to be applied to provide the desired range of the infrared sensor. The desired range may be achieved by controlling the field of view in the vertical direction.

The method may also comprise determining what magnitude of voltage needs to be applied to each electrochromic section for the desired field of view, sensitivity, and/or range. This may involve determining the required transmission of the predetermined range of infrared signals.

The controlling of the field of view may delimit the field of view into at least two separate detection areas. This allows for multiple independent areas to be monitored by a single sensor.

The application of voltage may reduce the transparency of the electrochromic section(s) for infrared signals in the predetermined range. For example, the electrochromic section may be opaque when no (or a low) voltage is applied and transparent when voltage (or a higher voltage) is applied. The use of the word transparent in the present application may refer to at least 70%, preferably at least 80%, or more preferably at least 90%, of infrared energy transmission. The use of the word opaque may refer to less than 20%, preferably less than 10% of infrared energy transmission.

The application of voltage may increase the reflectance of the electrochromic section(s) for infrared signals in the predetermined range. For example, the electrochromic section may be transparent when no (or a low) voltage is applied and reflective when voltage (or higher voltage) is applied. As mentioned above, the use of the word transparent in the present application may refer to at least 70%, preferably at least 80% or more preferably at least 90%, of infrared energy transmission. The use of the word reflective may refer to at least 80%, preferably at least 90% of infrared energy reflection.

In addition to the control of the field of view of the sensor, the detection sensitivity of the sensor may be tuned in the present invention. This may be achieved by a change of magnitude of the voltage applied at the electrochromic elements (as their electrochromic properties may vary depending on voltage) or at the detector output. This may achieve different sensitivities in different detection zones.

The predetermined range of infrared signals may have a wavelength of between 0.7 and 10 μm, preferably between 3 and 10 μm.

According to a second aspect the present invention provides a passive infrared sensor comprising: an infrared detector configured to detect infrared signals from a plurality of detection zones, and an electrochromic mask comprising a plurality of electrochromic sections, wherein each electrochromic section is electrically connected to a voltage source, and wherein the electrochromic mask is arranged such that the application of a voltage from the voltage source to one or more of the plurality of electrochromic sections changes the field of the view of the infrared sensor.

The passive infrared sensor of the second aspect may perform the method according to the first aspect, including any of the optional features described.

The electrochromic sections may comprise any one or a combination of: titanium dioxide (TiO2), (amorphous) tungsten trioxide (WO3), neodymium-Niobium (Nd-Nb), and tin (IV) oxide (SnO2), other metal oxides, acid doped polyaniline (PANI) films, polycrystalline, organic small molecules, triphenylamine-based polymers, conducting polymers, metal complexes, and plasmonic nanocrystals.

These materials are particularly useful for use in the far and medium infrared spectrum (between 3 and 10 μm).

The passive infrared sensor may comprise a mirror arranged to reflect infrared signals to the infrared detector, wherein the electrochromic mask is positioned between the mirror and the infrared detector. In this way, separate mirror sections may be masked.

The electrochromic mask may be a layer on a surface of the mirror. For example, a coating. This may reduce the size and complexity of the sensor. Alternatively, the electrochromic sections may form the mirror (if they are formed of a type of materials to reflect, as previously discussed).

The sensor may comprise a lens arranged to focus infrared signals on the infrared detector, wherein the lens is positioned between the electrochromic mask and the infrared detector or the electrochromic mask is positioned between the lens and the infrared detector. The lens may be a Fresnel lens.

The electrochromic mask may be a layer on a surface the lens. For example, a coating. This may reduce the size and complexity of the sensor.

The sensor may comprise an infrared absorber, designed to absorb and dissipate any infrared signals incident on it.

This may be arranged to absorb signals that are not incident on the detector (e.g. signals that are not reflected by the mirror described above).

The voltage source may be a single voltage source and this may be a controller. The controller may be arranged to control the magnitude of a voltage applied to each electrochromic section.

The controller may be configured to control the field of view of the passive sensor and/or the range of the passive sensor. The controller may be configured to determine which of the plurality of electrochromic sections a voltage needs to be applied to provide the desired field of view and/or range of the infrared sensor.

The electrochromic sections may each be connected to a single voltage source in parallel. This connection may be via a switch for each electrochromic section. Alternatively, each electrochromic section may be connected to its own voltage source.

BRIEF DESCRIPTION OF THE DRAWINGS

Certain example embodiments will now be described by way of example only and with reference to the accompanying drawings, in which.

DETAILED DESCRIPTION

Figure 1:
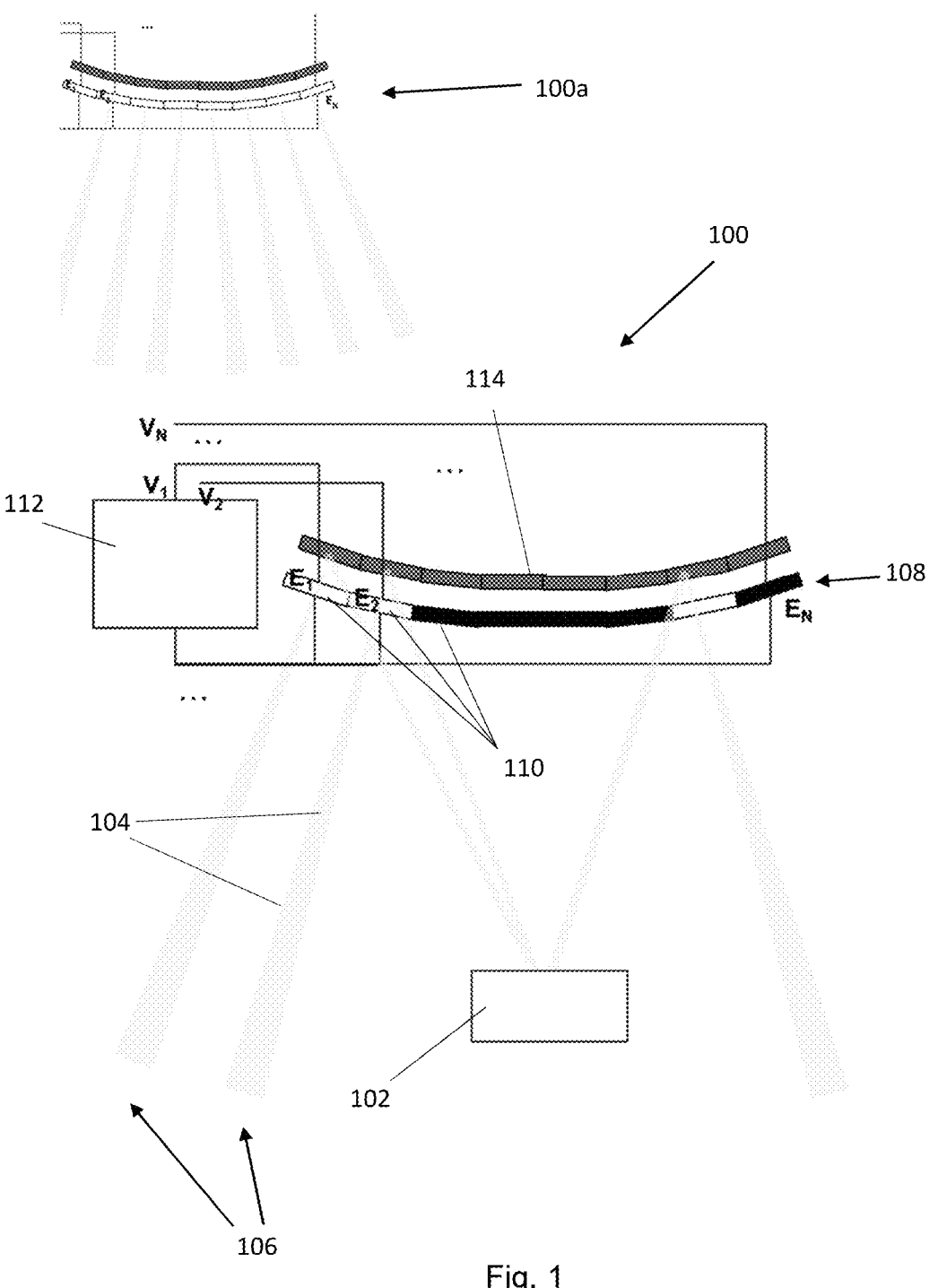
FIG. 1 shows schematic view of a first passive infrared sensor.

With reference to FIG. 1, a passive infrared (PIR) sensor 100 is shown.

The PIR sensor 100 comprises a detector 102, an electrochromic mask 108 comprising a plurality of electrochromic sections 110, a mirror 114, and a controller 112. The controller 112 is a voltage source and is electrically connected to each of the electrochromic sections 110 in parallel.

The PIR sensor 100 is arranged such that passive infrared signals 104 from a plurality of detection zones 106 are reflected by the mirror 114 and detected at the detector 102. The electrochromic sections 110 are used to optionally mask any given detection zone 106 by selectively blocking or transmitting infrared signals from the given detection zone.

To do so, each electrochromic section 110 has an operating state and a non-operating state. In this arrangement, the operating state occurs when the controller supplies a voltage to the electrochromic section 110. The electrochromic sections 110 are transparent in the non-operating state. However, application of a voltage by the controller 112 causes the electrochromic section 110 to become opaque, thereby blocking infrared signals, preventing them from pass through to the mirror 114 and reaching the detector 102. For anyone electrochromic section 110 his essentially masks off a given detection zone 106, thereby controlling the field of view of the PIR sensor 100.

The PIR sensor 100 with no voltages applied, and so no electrochromic sections 110 in the operating state is shown in the top left of FIG. 1 at reference 100a. It can be seen that signals from every detection zone 106 can reach the detector 102. In the main FIG. 1, voltage has been applied to the third to sixth and eight electrochromic sections 108, causing these to become opaque and masking the field of view into two distinct viewing areas. The first viewing area on the left comprising of two detection zones, the second on the right comprising of one detection zone. In this way the single PIR sensor 100 can be used to monitor two distinct areas.

Figure 2:
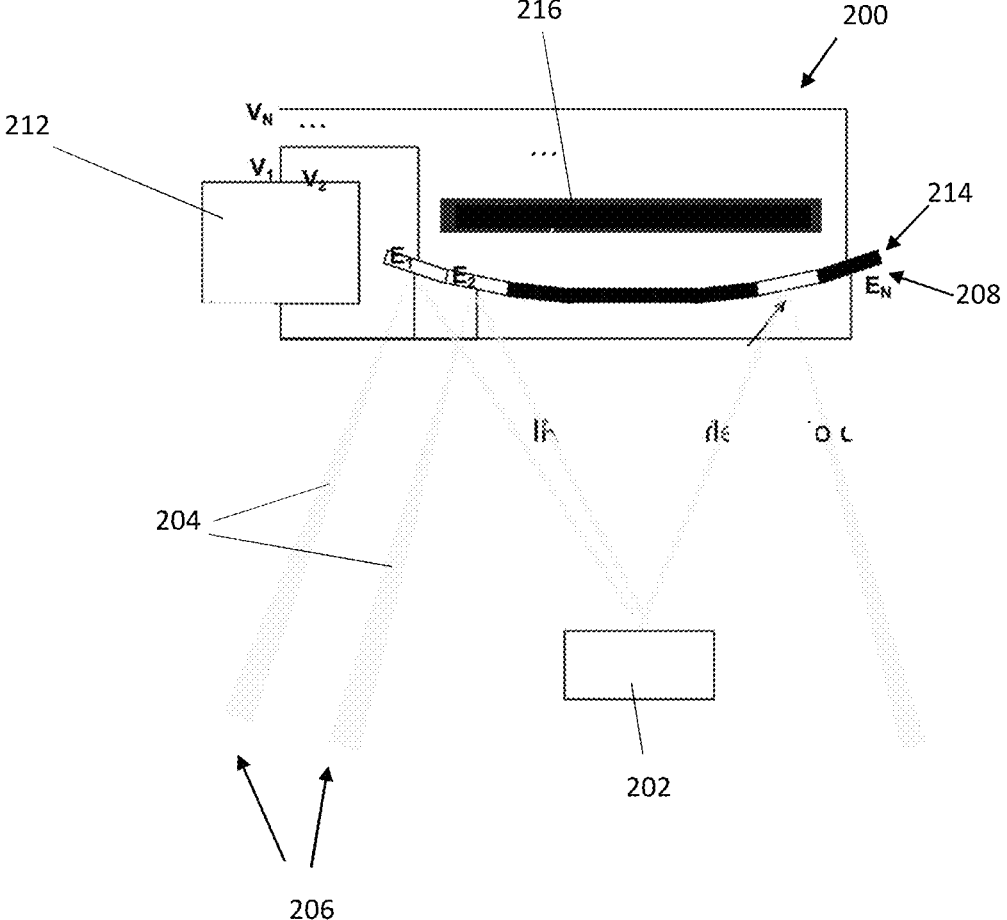
FIG. 2 shows a schematic view of a second passive infrared sensor.

FIG. 2 shows a similar PIR sensor 200 but with a different optical arrangement. The PIR sensor 200 comprises a detector 202, an electrochromic mask 208 comprising a plurality of electrochromic sections 210, an infrared absorber 216 and a controller 212. The controller 212 is a voltage source and is electrically connected to each of the electrochromic sections 210 in parallel.

Here, the electrochromic sections 210 are reflective in their non-operating state and opaque in the operating state. In FIG. 2, voltage is being applied to the third to sixth and eight electrochromic sections.

The PIR sensor 200 is arranged such that passive infrared signals 204 from a plurality of detection zones 206 are reflected by the electrochromic sections when in the non-operating state and detected at the detector 102. The electrochromic sections 110 are used to optionally mask any given detection zone 106 by selectively blocking infrared signals from the given detection zone when in the operating state. There is therefore no need for a separate mirror component, as the electrochromic sections 210 fulfil the function of a mirror (as previously described) when in the non-operating state and an electrochromic mask when in the operating state.

The infrared absorber 216 absorbs and dissipates any infrared signals that pass through the electrochromic sections in either state (this occurs as the materials may not be 100% reflective or opaque). This prevents the PIR sensor 200 from overheating.

Figure 3:
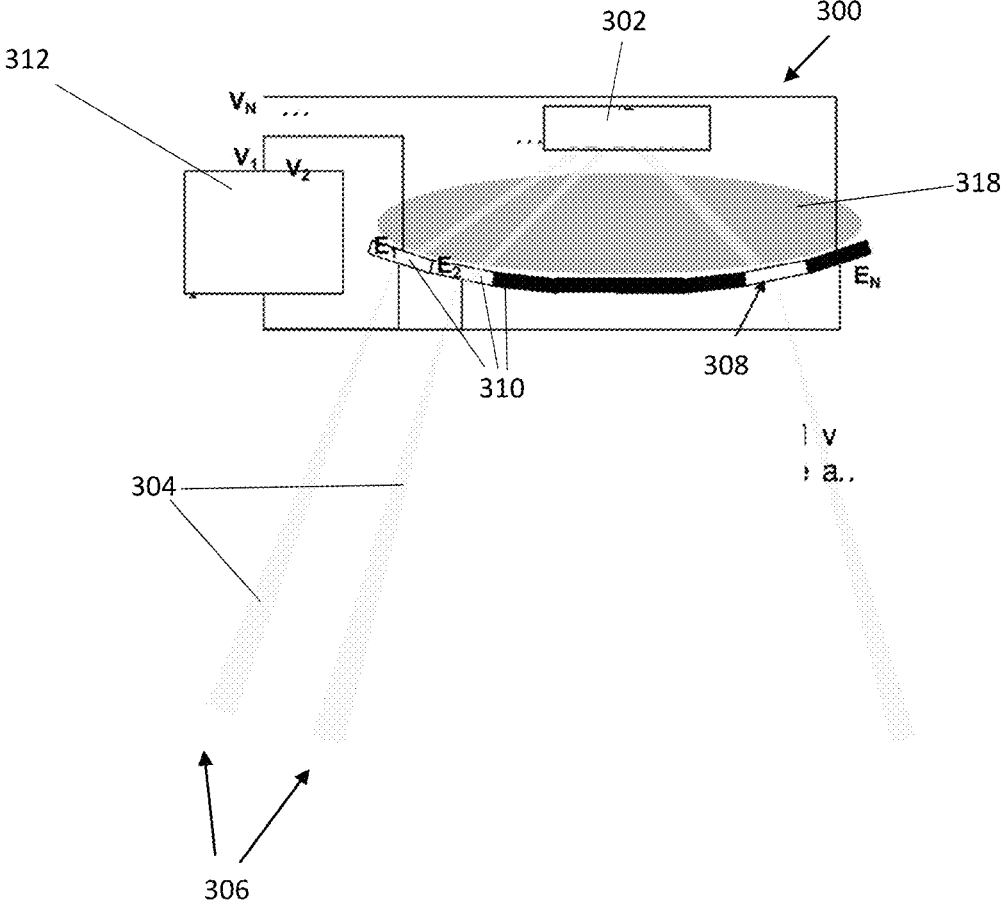
FIG. 3 shows a schematic view of a third passive infrared sensor.

FIG. 3 shows another similar PIR sensor 300, but again with a different optical arrangement.

The PIR sensor 300 comprises a detector 302, an electrochromic mask 308 comprising a plurality of electrochromic sections 310, a Fresnel lens 318 and a controller 312. The electrochromic mask 308 is applied to the lens 318 as a coating. The controller 312 is a voltage source and is electrically connected to each of the electrochromic sections 310 in parallel. In contrast to the arrangements shown in FIGS. 1 and 2 it can be seen that the detector 302 is positioned behind the electrochromic mask due to the use of a Fresnel lens 318 rather than a reflective mirror.

Here, the electrochromic sections 310 are transparent in their non-operating state and opaque in the operating state. In FIG. 3, voltage is being applied to the third to sixth and eight electrochromic sections.

The PIR sensor 300 is arranged such that passive infrared signals 304 from a plurality of detection zones 306 are transmitted through the electrochromic sections 310 when in the non-operating state, focussed by the lens 318 and detected at the detector 302. The electrochromic sections 310 are used to optionally mask any given detection zone 306 by selectively blocking infrared signals from the given detection zone 306 when in the operating state.

The invention claimed is:

1. A passive infrared sensor comprising:
   an infrared detector configured to detect infrared signals from a plurality of detection zones,
   and
   a mirror arranged to reflect infrared signals to the infrared detector, wherein an electrochromic mask is positioned between the mirror and the infrared detector or wherein an electrochromic mask forms the mirror;

wherein the electrochromic mask comprises a plurality of electrochromic sections, wherein each electrochromic section is electrically connected to a voltage source, and wherein the electrochromic mask is arranged such that the application of a voltage from the voltage source to one or more of the plurality of electrochromic sections changes the field of the view of the infrared sensor.

2. A method of controlling a field of view of a passive infrared sensor, the method comprising:
   providing a passive infrared sensor according to claim 1; and
   applying a voltage to one or more of the plurality of electrochromic sections to control transmission of a predetermined range of infrared signals to the detector from one or more of the plurality of detection zones.

3. A method according to claim 2, comprising:
   setting a desired field of view of the infrared sensor, wherein the desired field of view comprises a viewing angle; and
   determining which of the plurality of electrochromic sections the voltage needs to be applied to provide the desired field of view of the infrared sensor.

4. A method according to claim 2, comprising:
   setting a desired range of the infrared sensor, and
   determining a magnitude of the voltage that needs to be applied to each electrochromic section to provide the desired range of the infrared sensor.

5. A method according to claim 2, wherein the controlling of the field of view delimits the field of view into at least two separate detection areas.

6. A method according to claim 2, wherein the application of voltage reduces the transparency of the electrochromic section(s) for infrared signals in the predetermined range.

7. A method according to claim 2, wherein the application of voltage increases the reflectance of the electrochromic section(s) for infrared signals in the predetermined range.

8. A method according to claim 2, wherein the predetermined range of infrared signals has a wavelength of between 0.7 and 10 µm.

9. A passive infrared sensor according to claim 1, wherein the electrochromic sections comprise any one or a combination of: titanium dioxide ($TiO_2$), (amorphous) tungsten trioxide ($WO_3$), neodymium-Niobium (Nd-Nb), and tin (IV) oxide ($SnO_2$), other metal oxides, acid doped polyaniline (PANI) films, polycrystalline, organic small molecules, triphenylamine-based polymers, conducting polymers, metal complexes, and plasmonic nanocrystals.

10. A passive infrared sensor according to claim 1, wherein the electrochromic mask is positioned between the mirror and the infrared detector.

11. A passive infrared sensor according to claim 10, wherein the electrochromic mask is a layer on a surface of the mirror.

12. A passive infrared sensor according to claim 1, wherein the voltage source is a controller and the controller is arranged to control the magnitude of a voltage applied to each electrochromic section.

13. A passive infrared sensor according to claim 1, wherein the electrochromic mask forms the mirror.

* * * * *